US006250863B1

(12) United States Patent
Kamentser et al.

(10) Patent No.: US 6,250,863 B1
(45) Date of Patent: Jun. 26, 2001

(54) WASHER HAVING STRESSED AND UNSTRESSED STRAIN GAUGES

(76) Inventors: Boris Kamentser, 9552 Smoke Tree Ave.; Eugenia Kamentser, 9762 Red River Cr., both of Fountain Valley, CA (US) 92708

( * ) Notice: Subject to any disclaimer, the term of this patent is extended or adjusted under 35 U.S.C. 154(b) by 0 days.

(21) Appl. No.: 09/550,259

(22) Filed: Apr. 17, 2000

(51) Int. Cl.[7] .................. F16B 31/02; G01L 5/00
(52) U.S. Cl. .................. 411/10; 411/14; 73/761; 116/212
(58) Field of Search .................. 411/10, 11, 12, 411/14; 73/761; 116/212

(56) References Cited

U.S. PATENT DOCUMENTS 4,106,370 * 8/1978 Kraus et al. .................. 411/14 X
4,553,124 * 11/1985 Malicki .................. 411/14 X

FOREIGN PATENT DOCUMENTS

2212284 * 7/1989 (GB) .................. 411/14

* cited by examiner

Primary Examiner—Neill Wilson
(74) Attorney, Agent, or Firm—Leonard Tachner

(57) ABSTRACT

A washer having a plurality of strain gauges, at least one of which is positioned on a portion of the washer subjected to axial force and at least one of which is positioned on a portion of the washer not subjected to axial force. In a preferred embodiment, each such washer portion has two strain gauges and the total of four strain gauges are connected into a common bridge circuit. In the preferred embodiment the portion of the washer not subjected to axial force is a wedge partially cut into the washer structure and shortened axially to form a gap between the wedge and a surface abutting the washer. In this manner, axial force applied to the washer is not applied to the wedge. The resulting strain gauge configuration provides an electrical signal indication of axial stress that is high resolution and temperature insensitive.

10 Claims, 4 Drawing Sheets

WASHER HAVING STRESSED AND UNSTRESSED STRAIN GAUGES

BACKGROUND OF THE INVENTION

1. Field of the Invention

The present invention relates generally to the field of load sensors and more particularly to a washer having strain gauges for measuring axial forces applied to the washer.

2. Background Art

There are numerous applications where it would be highly advantageous to be able to measure axial load in a washer. For example, such a capability would permit extremely accurate application of clamping forces produced by a nut and bolt assembly of which the washer were a component. Another example is for measurement of the load on a hook supported by the washer in combination with a nut or other fastener. The use of strain gauges to measure force applied to a structure is a well-known application. By way of example, U.S. Pat. No. 5,872,320 discloses a force transducer which may be used in a computer keyboard to control the position of the cursor on a display screen. As shown in that patent, the strain gauges are typically configured in a bridge arrangement. Connecting the strain gauges in a bridge circuit provides a larger signal swing which results in greater resolution and also renders the output signal relatively insensitive to temperature variation which could otherwise alter the characteristics of the transducer with changes in ambient temperature.

Use of strain gauges in a small mechanical device like a washer, the entire structure of which is subjected to substantially the same axial forces, makes it difficult to connect strain gauges in a bridge configuration and thereby achieve the advantages of greater output signal amplitude swing and temperature insensitivity.

It would be highly advantageous if it were possible to provide a washer with strain gauges configured in a bridge arrangement where the performance improvements of true bridge operation could be realized.

SUMMARY OF THE INVENTION

The present invention comprises a washer having a plurality of strain gauges, at least one of which is positioned on a portion of the washer subjected to axial force and at least one of which is positioned on a portion of the washer not subjected to axial force. In a preferred embodiment, each such washer portion has two strain gauges and the total of four strain gauges are connected into a common bridge circuit. In the preferred embodiment the portion of the washer not subjected to axial force is a wedge partially cut into the washer structure and shortened axially to form a gap between the wedge and a surface abutting the washer. In this manner, axial force applied to the washer is not applied to the wedge. The resulting strain gauge configuration provides an electrical signal indication of axial stress that is high resolution and temperature insensitive.

OBJECTS OF THE INVENTION

It is therefore a principal object of the present invention to provide a washer having a plurality of strain gauges affixed to the washer for measuring axial load.

It is another object of the invention to provide a washer having a plurality of strain gauges connected in a bridge circuit for generating an output indicative of axial forces on the washer.

It is still another object of the invention to provide a washer for use with a plurality of strain gauges, at least one of the strain gauges being affixed to a portion of the washer subjected to axial forces and at least another of the strain gauges being affixed to a portion of the washer not subjected to axial forces.

It is another object of the invention to provide a washer having an axial surface and a radial surface, the radial surface providing a plurality of locations for affixed strain gauges for indicating axial forces directed at the axial surface, a portion of the axial surface being isolated from the remaining axial surface to provide a substantially zero axial force region of the washer.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
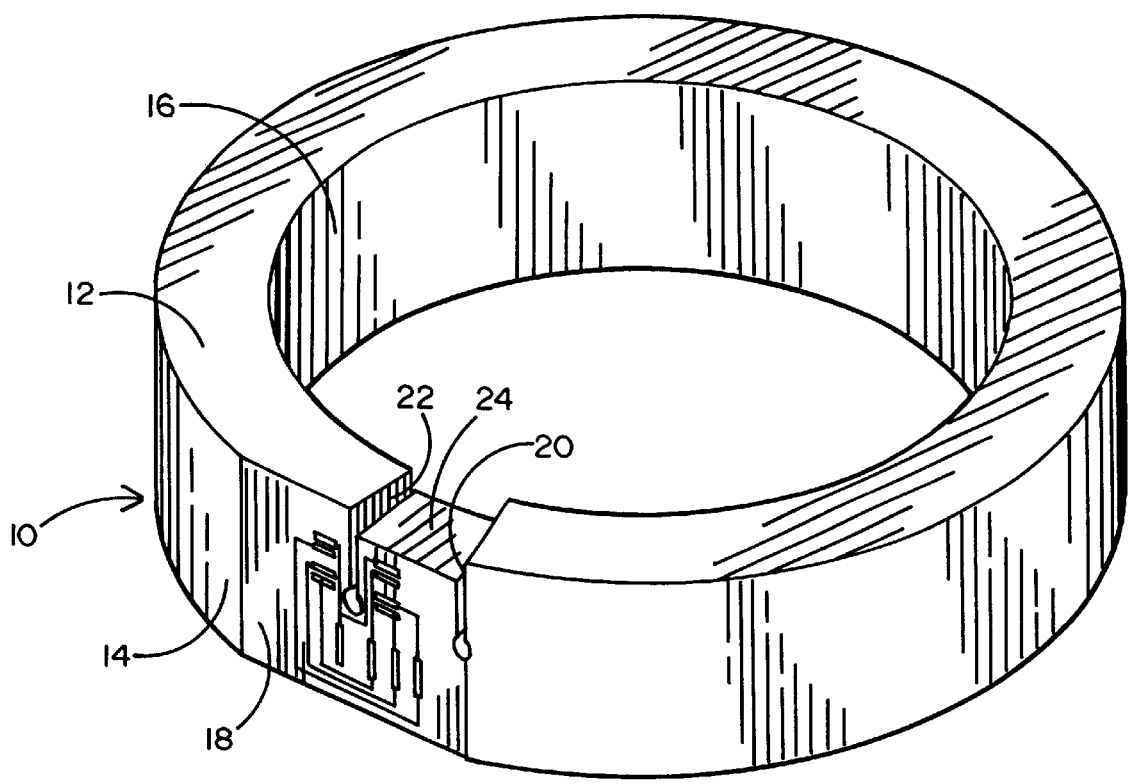
FIG. 1 is a three-dimensional view of a washer configured in accordance with a preferred embodiment of the invention.

Referring to the accompanying drawings it will be seen that a washer 10 has an axial surface 12, an outer radial surface 14 and an inner radial surface 16. As used herein the term "washer" is intended to encompass any tubular member which is subjected to axial forces. In the embodiment of FIG. 1, radial surface 14 has a flattened portion 18 to better accommodate strain gauge attachment.

As will be seen further, washer 10 has a pair of cuts 20 and 22, which extend radially from outer surface 14 to inner surface 16 and extend to a limited extent in an axial direction terminating in respective circular openings 28 and 30. The two cuts 20 and 22 define a wedge portion 24, the upper extend of which is reduced a selected distance from the axial surface 12 to isolate the wedge from axial forces applied to washer 10.

Figure 2:
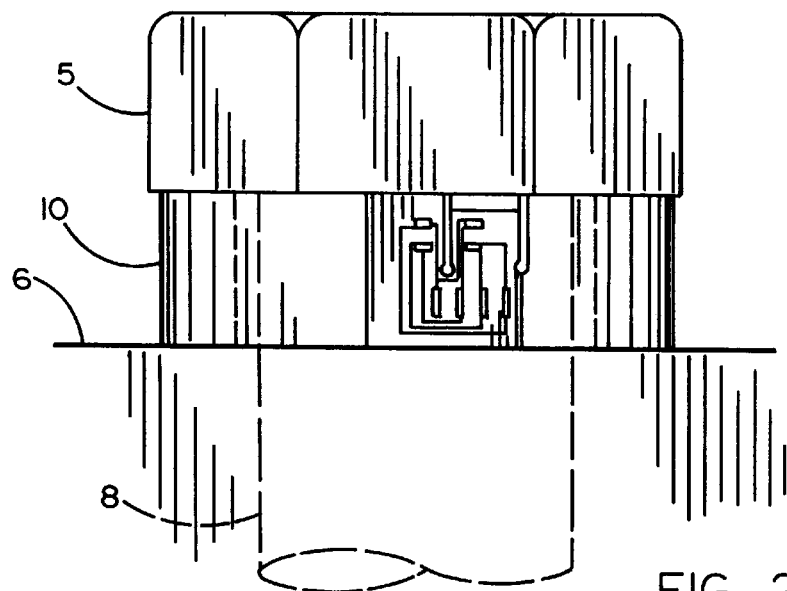
FIG. 2 is a plan view of a washer of the invention clamped between a bolt and a structure.
Figure 3:
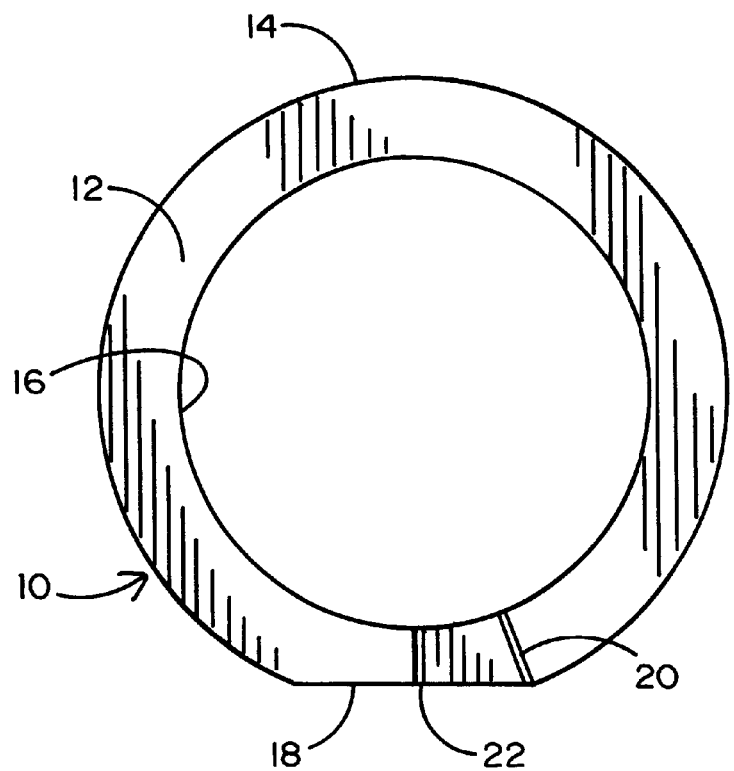
FIG. 3 is a top view of the washer of FIG. 1.
Figure 4:
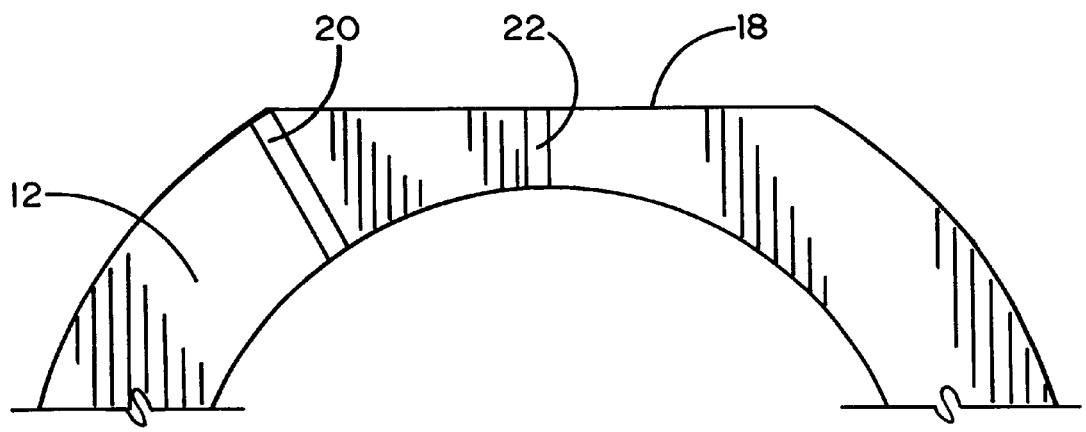
FIG. 4 is an enlarged top view of a portion of the washer of FIG. 1
Figure 5:
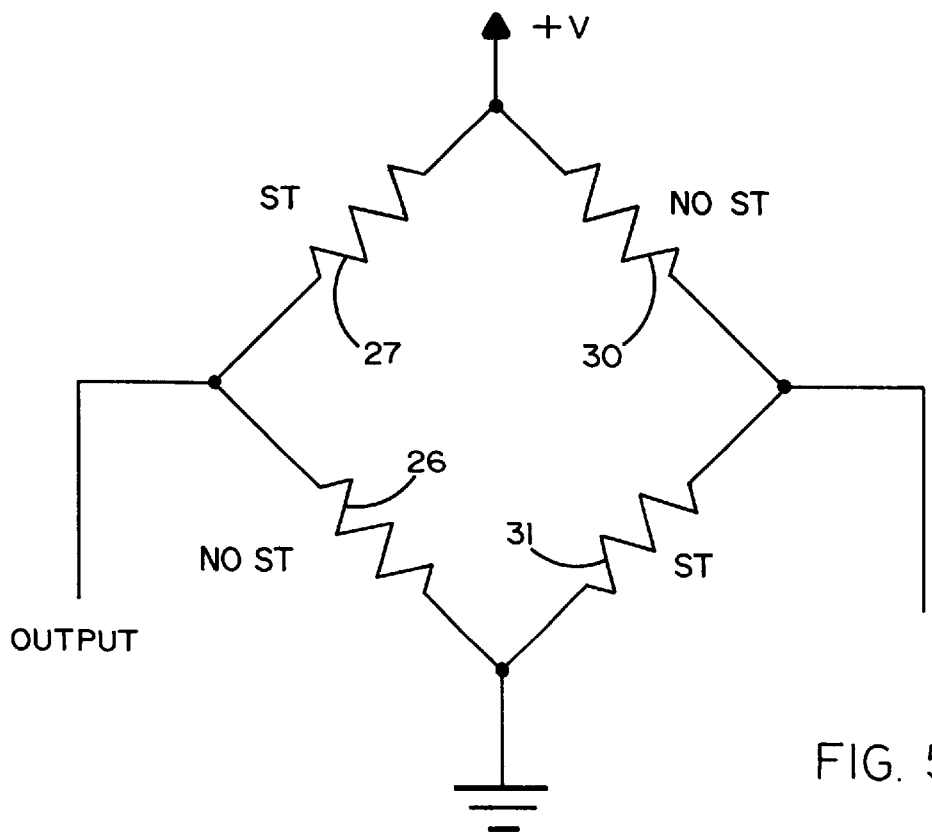
FIG. 5 is a bridge circuit used in the invention.

As seen best in FIGS. 1 and 2, a plurality of strain gauges are affixed to radial surface 14 along flattened portion 18. More specifically, strain gauges 26 and 29 are attached along wedge 24 between cuts 20 and 22 and strain gauges 27 and 31 are affixed at an adjacent area of the portion 18, but spaced from wedge 24. When an axial load is applied to washer 10, such as when washer 10 is clamped between a bolt head 5 of a bolt 8 and a structure 6, strain gauges 26 and 29 are isolated from the load and strain gauges 27 and 31 are subjected to the load stress through axial surface 12.

Figure 6:
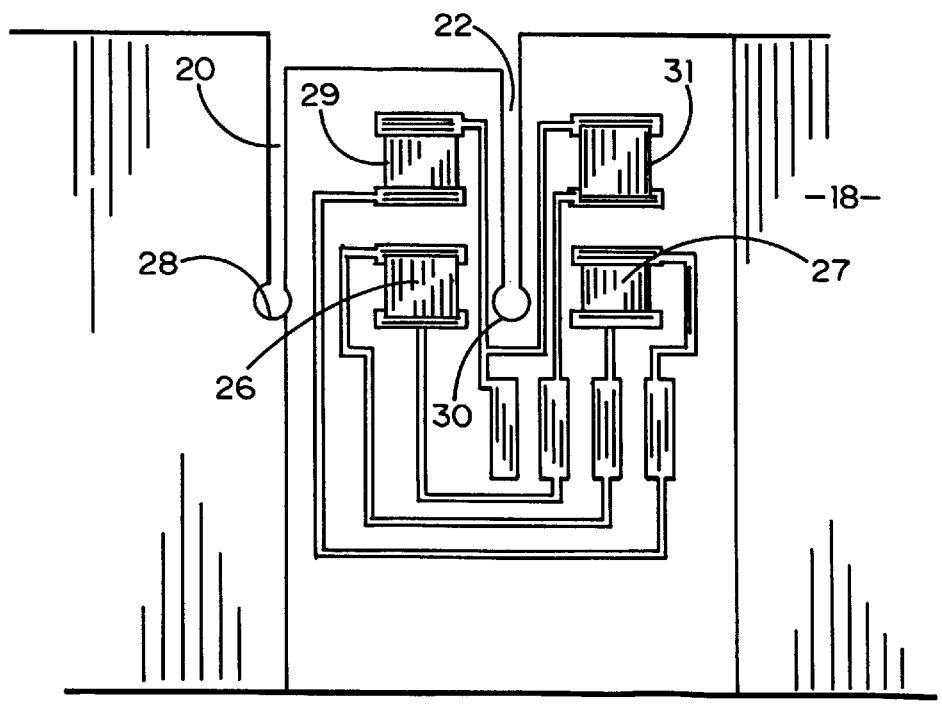
FIG. 6 is an enlarged elevational view of the radial surface of the washer of FIG. 1.

As seen in FIG. 6, the four strain gauges 26, 27, 29 and 31 are interconnected in a full bridge configuration between a DC voltage source +V and ground potential. Because the output is dependent upon a ratio of resistances of said strain gauges, the output in insensitive to temperature variations.

This is made possible by utilizing the unstressed strain gauges 26 and 29. Moreover, because of the bridge configuration, the output will vary over the range of zero to +V with axial stress between zero and maximum and may be conditioned in an amplifier (not shown) to provide a desired level of resolution. It will be understood that while a full bridge using four strain gauges is preferable, the temperature insensitivity feature of the invention may be achieved with two strain gauges, one mounted on wedge 24 and thus not subject to axial stress and one mounted off wedge 24 and thus subject to axial stress.

Figure 7:
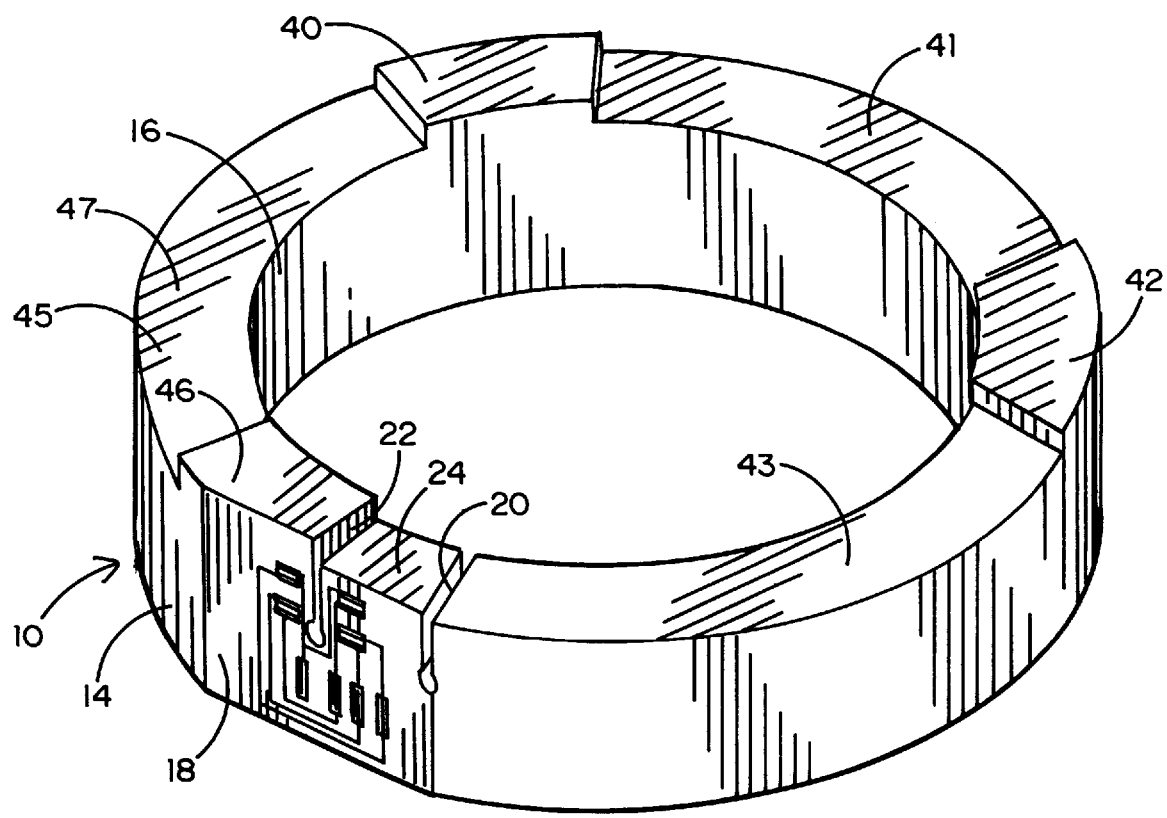
FIG. 7 is a three-dimensional view of a washer configured in accordance with an alternative embodiment of the invention.

An alternative washer geometry is shown in FIG. 7. The washer of FIG. 7 has an axial surface 45 which has a plurality of additional reduced height portions 41, 43 and 47 separated by full height portions 40, 42 and 46. The washer configuration of FIG. 7 is designed to compensate for irregular surfaces of bolt heads which could otherwise reduce the accuracy of the measurement provided by the strain gauges. By providing only a few relatively narrow full height portions, even an irregular bolt head will apply substantially equal forces at each such full height portion including full height portion 46 where the strain gauges are stressed by the axial load.

Having thus disclosed a preferred embodiment of the invention, it being understood that numerous modifications and additions are contemplated and will now be apparent to those having the benefit of the above description,

What is claimed is:

1. A washer having opposed axial surfaces, an outer radial surface and an inner radial surface and comprising a plurality of strain gauges affixed to said outer radial surface, said washer having a pair of cuts from said outer radial surface to said inner radial surface and from a first of said axial surfaces toward a second of said axial surfaces to form a wedge, said wedge terminating short of said first axial surface to isolate said wedge from axially-directed forces applied to said washer;

at least one of said strain gauges being affixed to said outer radial surface at a location on said wedge and at least one of said strain gauges being affixed to said outer radial surface at a location spaced from said wedge.

2. The washer recited in claim 1 wherein said strain gauges are interconnected to provide an electrical signal indication of said axially-directed forces.

3. The washer recited in claim 1 wherein said plurality of strain gauges comprises four strain gauges, two of said strain gauges mounted to said outer radial surface at said wedge and two of said strain gauges mounted to said outer radial surface spaced from said wedge.

4. The washer recited in claim 3 wherein said four strain gauges are interconnected as respective arms of a full bridge to provide an electrical signal indication of said axially-directed forces.

5. The washer recited in claim 1 wherein said outer radial surface comprises a flattened portion for receiving said strain gauges.

6. A washer comprising opposed axial surfaces and a plurality of strain gauges for measuring axial forces applied to said surfaces, at least one portion of said washer being isolated from said axial forces, at least one of said strain gauges being affixed to said washer at said at least one isolated portion and at least one other of said strain gauges being affixed to said washer at a location subjected to said axial forces.

7. The washer recited in claim 6 wherein said strain gauges are interconnected to provide an electrical signal indication of said axially-directed forces.

8. The washer recited in claim 6 wherein said plurality of strain gauges comprises four strain gauges, two of said strain gauges being affixed to said washer at said isolated portion and two other of said strain gauges being affixed to said washer at a location subjected to said axial forces.

9. The washer recited in claim 8 wherein said four strain gauges are interconnected as respective arms of a full bridge to provide an electrical signal indication of said axial forces.

10. The washer recited in claim 6 further comprising a plurality of said isolated portions separated by spaced portions that are subjected to said axial forces for distributing such axial forces substantially equally around the washer at selected locations.

\* \* \* \* \*